(No Model.)  3 Sheets—Sheet 3.

R. HARDIE.
LOCOMOTIVE.

No. 247,343.  Patented Sept. 20, 1881.

Witnesses:—
Fred Haynes
Thomas E. Birch.

Inventor:
Robert Hardie
by his Attorneys

UNITED STATES PATENT OFFICE.

ROBERT HARDIE, OF HOBOKEN, NEW JERSEY, ASSIGNOR TO THE PNEUMATIC TRAMWAY ENGINE COMPANY, OF NEW YORK, N. Y.

LOCOMOTIVE.

SPECIFICATION forming part of Letters Patent No. 247,343, dated September 20, 1881.

Application filed January 26, 1881. (No model.)

*To all whom it may concern:*

Be it known that I, ROBERT HARDIE, a resident of the city of Hoboken, in the county of Hudson and State of New Jersey, have invented certain new and useful Improvements in Locomotives, of which the following is a specification.

Although some features of my invention are applicable to locomotives generally, the invention is particularly intended for use in locomotives which are operated by compressed air, and will be described in connection with such a locomotive. In such locomotives air of very high pressure is stored in tanks or reservoirs upon the locomotive, and is preferably passed through a reducing-valve to a reduced air tank or reservoir, in which it is stored at a moderate working pressure of, say, one hundred (100) pounds, and from which the supply of air for operating the engine is taken. Air is stored in the tanks or reservoirs of the locomotive at a great pressure, oftentimes reaching several hundred or even a thousand pounds, and to enable them to withstand so great a pressure the tanks or reservoirs are preferably of small diameter, and consequently a number of such tanks or reservoirs are necessary to contain enough compressed air for a long trip.

Certain features of the invention consist in a novel arrangement and combination, in a locomotive, of several tanks or reservoirs for compressed air, whereby I produce a large storage capacity for air, and at the same time do not obstruct the view from the engineer's cab upon the track in advance of the locomotive.

Other features of the invention consist in novel details of construction, to be hereinafter described.

Figure 1:
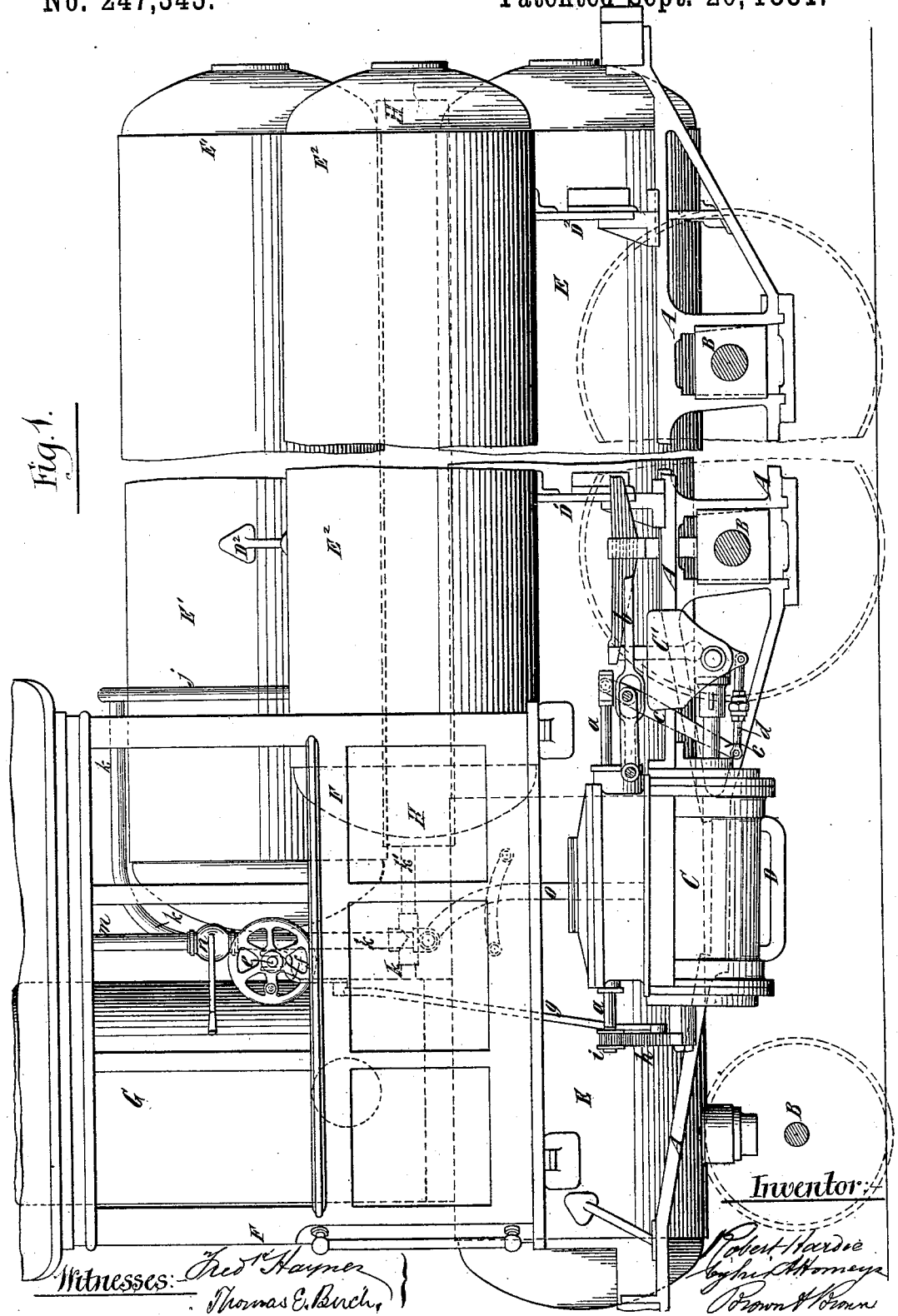
Figure 2:
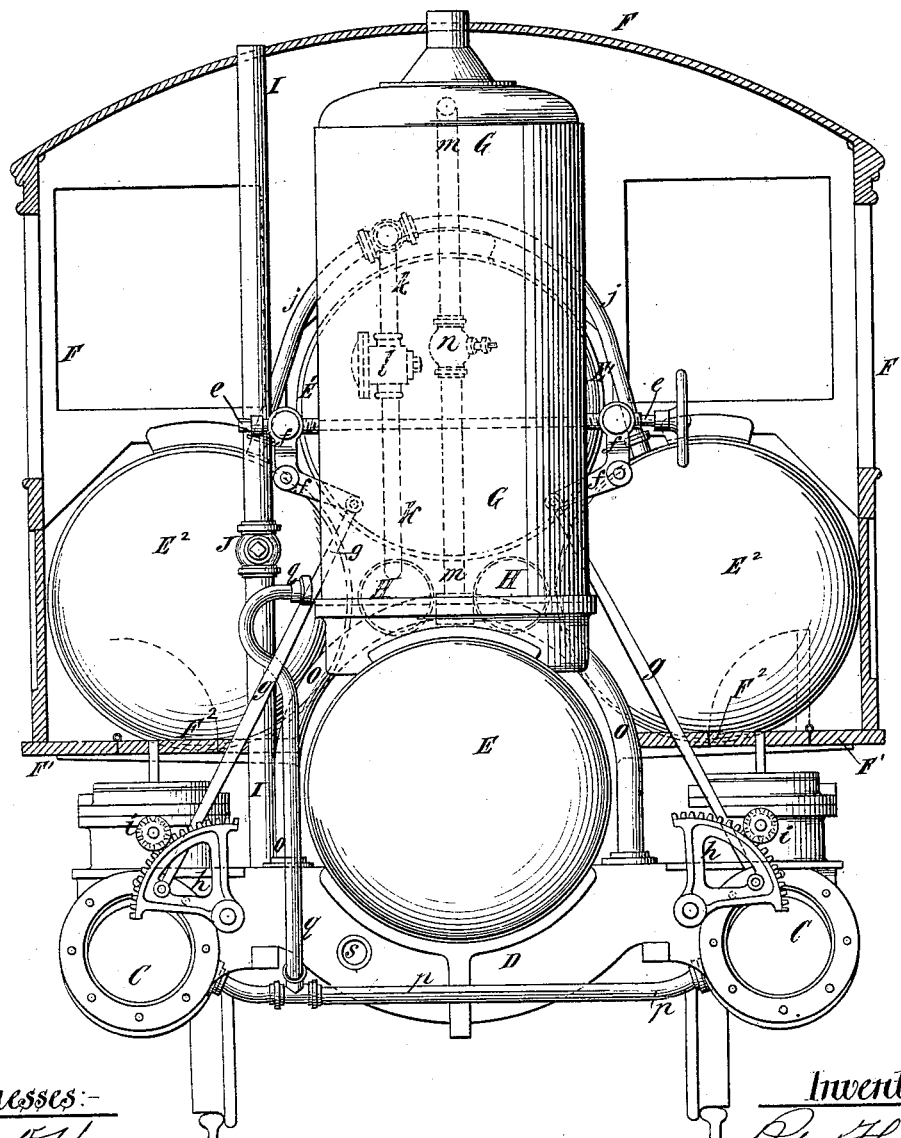
Figure 3:
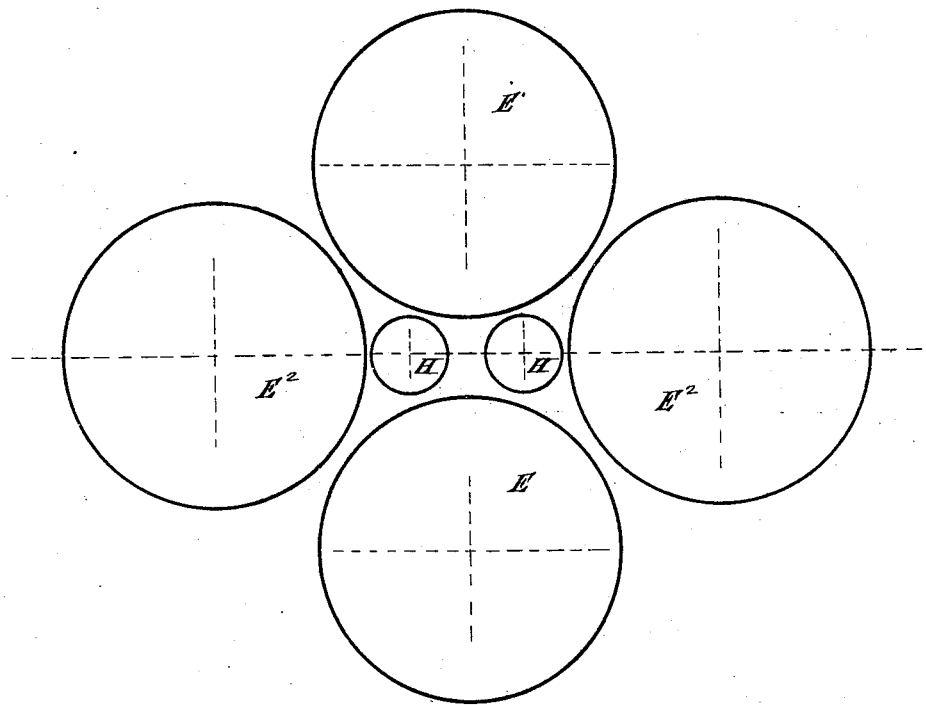

In the accompanying drawings, Figure 1 represents a side view of a locomotive for compressed air embodying my invention, portions being broken away to reduce the length of the figure. Fig. 2 represents an end view thereof, the rear end of the cab being removed to better illustrate my invention; and Fig. 3 represents a sectional diagram view of the several reservoirs for compressed air.

Similar letters of reference designate corresponding parts in all the figures.

In the drawings many parts of the locomotive are omitted, only those parts being shown which seem to be of most importance in describing the present invention.

A designates the wrought-iron frame of the locomotive, which is forged in the desired form; and B represents the axles, the wheels being shown in Fig. 1 in dotted outline. The locomotive-frame A, with its superposed weight, may be suspended from the axles by any desirable arrangement of springs, the springs being only partly shown in the drawings.

C designates the cylinders, which are bolted to the frame A, and are connected together by a saddle, D, in the ordinary manner.

In the locomotive here shown four tanks or reservoirs, E E' E² E², are represented as composing the principal part of the storage capacity, and are arranged as follows: The tank or reservoir E, which is the longest of the four, is arranged centrally in the width of the locomotive, and supported upon the frame A by the cylinder-saddle D, and by the guide and waist bearers D' D². The under side of the reservoir E is nearly as low as the axles B, and hence increases the stability of the locomotive. Immediately over the reservoir E is arranged the cab F, the floor F' of the cab being somewhat below the top of the reservoir, as seen clearly in Fig. 2. The reservoir E' is arranged directly over the reservoir E, and is shown as of the same diameter, although it might be larger or smaller. As clearly shown in Fig. 1, the forward end of the reservoir E' is coincident with the forward end of the reservoir E, but its rear end only projects slightly within the cab F, and does not extend so far rearward as does the reservoir E, for a purpose hereinafter mentioned. The two other reservoirs E² are arranged one upon each side of the two reservoirs E E', and about midway vertically between the two said reservoirs E E'. The two reservoirs E² are shown as of the same diameter as the reservoir E, but are slightly shorter, their rear ends projecting less into the cab F than the reservoir E', and hence affording plenty of standing room for the engineer upon each side of the reservoir E, and the two reservoirs E² are so low down that the engineer may readily see over either of them, and his view of the track in front of the locomotive is not at all obstructed. The reservoirs E² are supported upon the frame A by the bearers D' D², and the upper reservoir, E', is supported at each side by braces D², extending from the side reservoirs, E².

Turning now to a description of the working parts, the cylinders C are provided with slide-valves, and also with cut-off slide-valves, which are operated by the cut-off-valve stems $a$. The main-valve stems are operated by rods $b$, while the cut-off-valve stems $a$ are operated through levers $c$ and rods $d$ from the cross-heads C' of the engine, as most clearly shown in Fig. 1. In order to vary the point of cut-off, it is necessary to turn the slide-valve stems $a$, and this may be effected at once by turning the shaft $e$, which is arranged in the cab F, in one or the other direction. As clearly shown in Fig. 2, the shaft $e$, when turned, vibrates bell-crank levers $f$, which are connected by rods $g$ with toothed sectors $h$. These sectors engage with pinions $i$ upon the cut-off-valve stems $a$, and when turned the right and left hand threads upon the stems move the cut-off valves farther apart or nearer together, and thus vary the point of cut-off.

I may here remark that the mechanism for working the cut-off valves and adjusting them forms no part of this application, but are described in another application for Letters Patent.

Turning now to a description of the pipe-connections between the several reservoirs and the engines, $j$ designates a pipe which connects the two reservoirs E² with the reservoir E', and the reservoir E may be connected with the reservoir E' by any pipe suitably arranged. It has been found very advantageous to pass the air, after it leaves the several reservoirs above described, and before it reaches the engines, through a boiler, tank, or reservoir containing hot water; and G designates such a boiler, tank, or reservoir, erected upon the reservoir E within the cab F, but having no connection with said reservoir E. From the pipe $j$ the compressed air passes through a branch pipe, $k$, downward and into the tank or reservoir G, and in said branch pipe is arranged a reducing-valve, $l$, by which the air is reduced from a pressure of several hundred pounds, which is the pressure in the several reservoirs E E' E² E², to a working-pressure of one hundred pounds, more or less. The air from the pipe $k$ passes upward through the water in the tank G, which is heated by any suitable means, and collects in the top of said tank, from whence the supply for operating the engines is taken by a pipe, $m$. This pipe $m$, in which is located the throttle-valve $n$, passes downward from the top of the tank G, and from it extend branch pipes $o$, which communicate through suitable passages in the saddle D with the valve-chests of the cylinders C.

For the purpose of utilizing the vacant space between the four reservoirs E E' E² E², I arrange therein two small pipes or reservoirs, H, (shown dotted in Fig. 2,) which are connected with the heating-tank G by a pipe, $k'$, and the pipe $k$, and which form part of said tank. The relative positions of the several reservoirs E E' E² E² H H is clearly shown in the diagram view, Fig. 3.

The saddle D, between the two cylinders C, is made hollow, and forms an exhaust-chest for the two cylinders, and from said saddle extends the exhaust-pipe I, as seen in Fig. 2.

In another application for Letters Patent I have described an arrangement whereby the cylinders C, when their valves are moved to a central position, may be used as pump-cylinders for compressing air and forcing it into the reservoirs of the locomotive, the said cylinders being provided with separate suction and discharge valves for air at each end; and I have also described that the supply of air for said cylinders, when used as pumps, may be drawn from the vacuum chamber or chambers of a vacuum-brake apparatus, thus dispensing with a separate motor for maintaining a vacuum in said chamber or chambers. I have here shown the saddle D as having an inlet-opening, S, to which may be attached a hose or pipe connection leading from a vacuum-reservoir upon the train, and when acting as pumps the cylinders draw their supply of air from the saddle.

I provide the exhaust-pipe I with a cock or valve, J, and when it is desired to pump from the vacuum-chamber of the brake apparatus said cock or valve is closed, so that the air cannot be drawn down the exhaust-pipe.

The two cylinders C are connected by a pipe, $p$, and both cylinders are connected by a pipe, $q$, with the heating-tank G, as shown clearly in Fig. 2, and when the cylinders are used as pump-cylinders the air is forced through these pipes into the said heating-tank G and into the two small auxiliary tanks or reservoirs H.

The arrangement of the cab F over the cylinder C is very advantageous, inasmuch as the pipe-connections from the throttle-valve are reduced in length, and because of the convenient arrangement of mechanism for adjusting the cut-off valves shown, which would be greatly complicated if the cab were arranged at the opposite end from the cylinders. The floor F' of the cab is provided with trap-doors F², as shown in Fig. 2, which provide for very conveniently reaching the cylinders, if necessary for oiling or other purpose.

I am aware that compressed-air locomotives have been provided each with several storage-reservoirs, which have been variously arranged, one locomotive having a tender in which air-reservoirs are arranged in nests of four, two of which are arranged in one horizontal plane vertically over the other two, which are also arranged in one horizontal plane; and I am also aware that it is old to pass compressed air through a tank containing hot liquid for the purpose of heating the air. Hence I claim neither of these as of my invention.

What I claim as my invention, and desire to secure by Letters Patent, is—

1. The combination, in a compressed-air locomotive, of two air-reservoirs arranged horizontally one above another, two other air-reservoirs arranged one upon each side of the first two and about midway vertically between them, and a cab in rear of said air-reservoirs, whereby I provide ample storage capacity and still afford a clear view of the track ahead from the cab, substantially as specified.

2. The combination, in a compressed-air locomotive, of the longer air-reservoir E, the shorter reservoir E', arranged immediately over the same, the two reservoirs $E^2 E^2$, arranged one upon each side of the reservoirs E E', and about midway in vertical height between them, and the heating tank or reservoir G, all substantially as and for the purpose specified.

3. The combination, in a compressed-air locomotive, of the longer air-reservoir E, the shorter air-reservoirs E' $E^2 E^2$, the heating tank or reservoir G, and the tubes or smaller reservoirs H, all arranged substantially as and for the purpose specified.

4. The combination, in a compressed-air locomotive, of cylinders C C, the hollow saddle D, connecting said cylinders and provided with an inlet-opening, S, and the exhaust-pipe I, extending from said saddle and provided with a cock, all substantially as and for the purpose specified.

ROBT. HARDIE.

Witnesses:
FREDK. HAYNES,
A. C. WEBB.